Sept. 1, 1953 A. M. WICKWIRE ET AL 2,650,685
CENTRIFUGAL CLUTCH
Filed Feb. 21, 1951 2 Sheets-Sheet 1
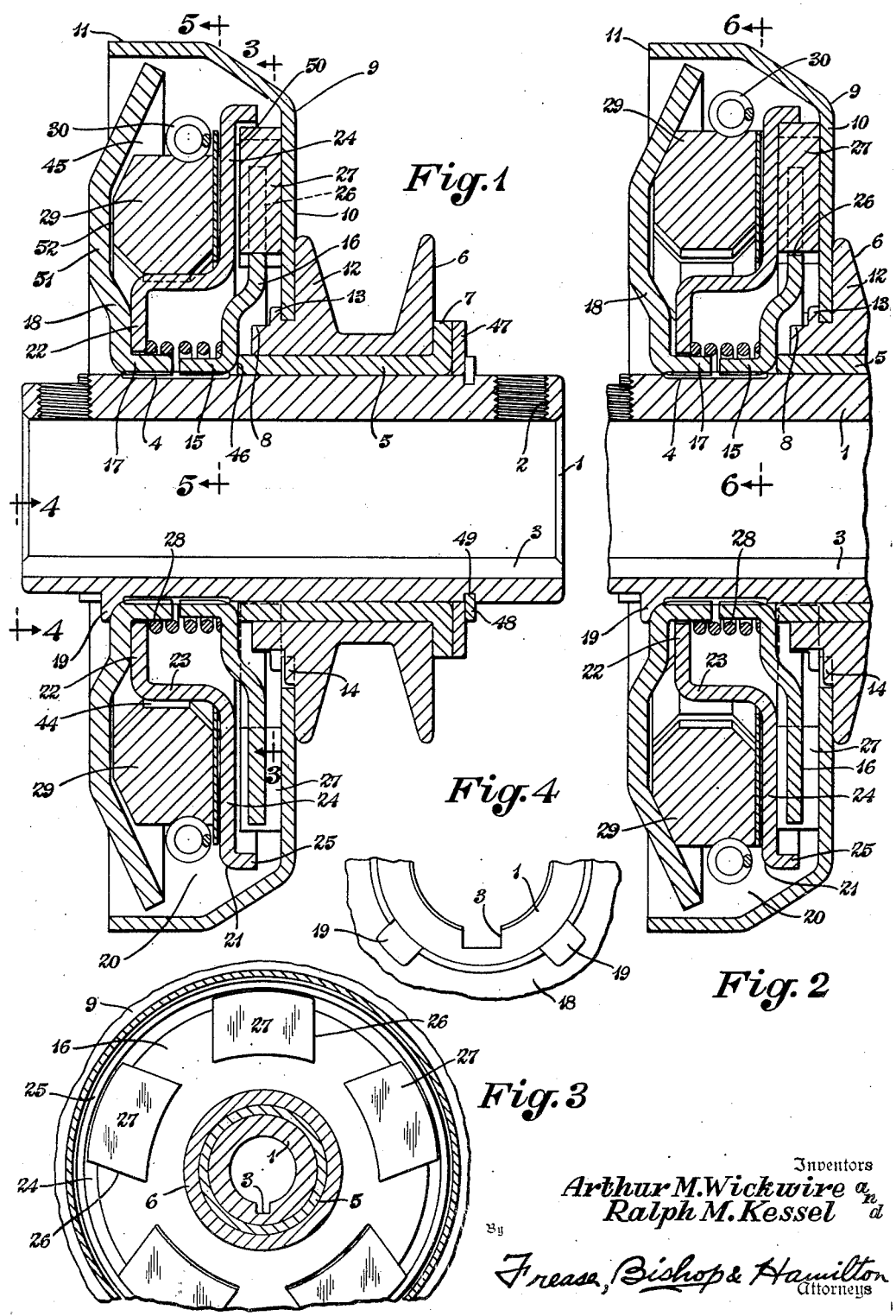
Inventors
Arthur M. Wickwire and
Ralph M. Kessel
By Freasa, Bishop & Hamilton
Attorneys Inventors
*Arthur M. Wickwire* and
*Ralph M. Kessel*

By *Freasa, Bishop & Hamilton*
Attorneys

Patented Sept. 1, 1953

2,650,685

UNITED STATES PATENT OFFICE 2,650,685

CENTRIFUGAL CLUTCH

Arthur M. Wickwire, North Canton, and Ralph M. Kessel, Massillon, Ohio, assignors to Automatic Steel Products, Inc., Wilmington, Del., a corporation of Delaware Application February 21, 1951, Serial No. 212,126

8 Claims. (Cl. 192—105)

The invention relates to clutches and more particularly to a weight actuated centrifugal clutch in which axially movable members are forced into driving engagement with a driven member by forces resulting from radial movement of a series of centrifugally actuated weights, and in which there is an inertia delay of clutch engagement in addition to a speed control thereof.

There are examples in the prior art of liquid actuated clutches in which a body of mercury is used for effecting a driving connection between the driving and driven clutch members and in which an inertia delay of clutch engagement is provided. Such clutches are desirable for use for instance with shaded pole motors which have no starting and must be brought up to speed prior to establishing a driving connection between the load and motor. However, such clutches have the disadvantage that they cannot be operated at temperatures below the freezing point of mercury. However, present day uses of devices incorporating centrifugal clutches as elements require that the devices be capable of operation at temperatures below the freezing point of mercury.

There are also examples in the prior art of weight actuated centrifugal clutches which have sought to incorporate an inertia delay of clutch engagement for a time interval after the driving member commences to rotate. However, such constructions include radially movable, curved friction shoes which are directly engaged by the weights that move the shoes outward to establish clutch engagement. There are many disadvantages to such a construction. The component parts thereof are of complicated design and the clutches are difficult and expensive to manufacture, assemble and repair and it is particularly difficult to replace worn friction shoes. Moreover proper assembly and operation of such clutches depends upon maintaining very exacting tolerances in the diameters of curved surfaces on the weights, friction shoes and driven member which are in contact one with another when the clutch is engaged. Otherwise, unequal pressures between the several weights and friction shoes may result thereby reducing the effective capacity of the clutch.

Furthermore, these conditions of maintenance of exact clutch part diameters are disturbed when wear occurs on the outer arcuate surfaces of the friction shoes. Such wear causes a change in the relative location of the outer curved surfaces of the wedges with respect to the outer surfaces of the friction shoes. Such change affects proper clutch operation unless each particular weight always engages the same friction shoe in the same position or relation each time the clutch is operated. However, it is impossible to obtain such clutch operating conditions.

Finally, in such a radial clutch the individual weight segments separate circumferentially as the segments move outward under the influence of centrifugal force. Since the relative location of the weight segments and the space between weight segments with respect to the arcuate friction shoes is a matter of chance when the segments directly engage and press the shoes radially outward, unequal pressures may be exerted by the weights on different friction shoes or on different portions of any individual shoe, resulting in unsatisfactory clutch operation.

Because of these difficulties with prior constructions there is an existing need in the art for a centrifugal clutch having inertia delayed engagement and other advantageous features of mercury actuated clutches which can be used and will operate satisfactorily at temperatures below the freezing point of mercury and which avoids the described and other difficulties inherent in a radially engaged weight actuated clutch.

Other equally important factors in the construction of a clutch to satisfy the existing need are that the basic design of the clutch must be such that the size and capacity of the clutch may be altered with a minimum change in the size and shape of the component parts of the clutch so as to reduce tooling and manufacturing costs, since in most clutch applications the initial cost of the clutch as well as the ability to repair or replace clutch parts quickly and inexpensively are factors of utmost importance.

Accordingly, it is a fundamental object of the present invention to provide a weight actuated centrifugal clutch incorporating inertia delayed engagement and eliminating radial actuation and engagement of friction shoes and the disadvantages inherent in such constructions.

Furthermore, it is an object of the present invention to materially simplify the design, construction, assembly and repair of weight actuated centrifugal clutches.

Moreover, it is an object of the present invention to provide a new weight actuated, inertia-delayed-engagement centrifugal clutch whose component parts are of very simplified design and involve a minimum of changes for increasing clutch size or capacity.

Furthermore, it is an object of the present invention to provide a new weight actuated centrifugal clutch incorporating the foregoing features which may be fabricated in accordance with simple and inexpensive production methods.

Also, it is an object of the present invention to provide a new weight actuated centrifugal clutch construction utilizing flat shoes of friction material which are readily accessible, which may be renewed when worn without difficulty, and which may be manufactured at a minimum cost with a minimum scrap loss.

Likewise, it is an object of the present invention to provide a new weight actuated centrifugal clutch construction formed essentially of stamped, pressed or drawn sheet metal, preferably sheet steel parts, from which heat developed during operation may be readily dissipated and in which a large clutch capacity can be obtained in a small sized assembly.

Furthermore, it is an object of the present invention to provide a new weight actuated centrifugal clutch in which there is no residual friction in the clutch assembly between the driving and driven members when the clutch is at rest.

Also, it is an object of the present invention to provide a new weight actuated centrifugal clutch construction in which absolutely uniform pressure is exerted on the friction elements by the action of the weights regardless of the relative location or position of any weight with respect to any friction shoe.

Furthermore, it is an object of the present invention to provide a new weight actuated centrifugal clutch incorporating inertia delayed engagement which is free from appreciable noise, chatter or vibration, and maintains dynamic balance in operation and use.

Finally, it is an object of the present invention to provide a new weight actuated centrifugal clutch incorporating inertia delayed engagement in which some or all of the foregoing advantages may be incorporated in a clutch which is simple in construction, durable and effective in operation, and extremely inexpensive to manufacture and repair.

These and other objects and advantages apparent to those skilled in the art from the following description and claims may be obtained, the stated results achieved, and the described difficulties overcome by the devices, constructions, arrangements, combinations, sub-combinations, parts and elements which comprise the present invention, the nature of which is set forth in the following general statement, preferred embodiments of which—illustrative of the best modes in which applicants have contemplated applying the principles—are set forth in the following description and shown in the drawings, and which are particularly and distinctly pointed out and set forth in the appended claims forming part hereof.

The nature of the improvements of the present invention may be stated in general terms as including, in an axial, weight actuated centrifugal clutch, a preferably tubular hub driving member, torque or drive plate means preferably pressed onto the hub, provided with a plurality of annularly spaced radially-opening slots, back plate means preferably pressed onto the hub and forming with said torque plate means an annular compartment, an axially movable pressure plate located in said compartment and mounted for movement relatively to and between said drive and back plate means, spring means normally urging said pressure plate means away from said drive plate means, a series of weight segments mounted in said compartment interposed between said back and pressure plate means, there being a circumferential shoulder formed on said pressure plate means, said weight segments in retracted position and at rest forming an annular ring having an internal diameter slightly larger than the outer diameter of said pressure plate shoulder, spring means surrounding said weight segments normally when the clutch is at rest holding said weight segments in retracted position, a spider-like ring member in said compartment having radially extending fingers engaged in radial slots in said weight segments for directing movement of said weight segments in radial paths when said segments move outwardly under the influence of centrifugal force, a series of flat friction shoe members carried in said torque plate slots and rotatably driven thereby, a driven member such as a pulley preferably rotatably mounted on bearing means on said driving member hub, means for assembling said driven member and bearing means on said hub, there being a sheet metal housing member mounted on said driven member having a disc-like wall engageable by said friction shoes and provided with an annular skirt wall circumferentially surrounding said compartment and back plate means, means on said pressure plate member preventing radial movement of said friction shoes; and complementary conical surfaces on said back plate means and said weight segments engageable upon radial movement of said weight segments imparted by centrifugal force to move the weight segments axially, thereby axially moving said pressure plate toward said friction shoes to establish driving engagement between said friction shoes and the disc portion of said driven housing member.

By way of example, preferred embodiments of the improved centrifugal clutch are illustrated in the accompanying drawings forming part hereof wherein:

Figure 1 is an enlarged vertical section showing a clutch incorporating the improvements of the present invention with the clutch parts in the position that they assume when the clutch is at rest;

Fig. 2 is a view similar to Fig. 1 but illustrating the parts in the position that they assume when the clutch is running and engaged;

Fig. 3 is a fragmentary sectional view on a smaller scale looking in the direction of the arrows 3—3, Fig. 1;

Fig. 4 is a fragmentary view on a smaller scale looking in the direction of the arrows 4—4, Fig. 1;

Similar numerals refer to similar parts throughout the various figures of the drawings.

Figure 8:
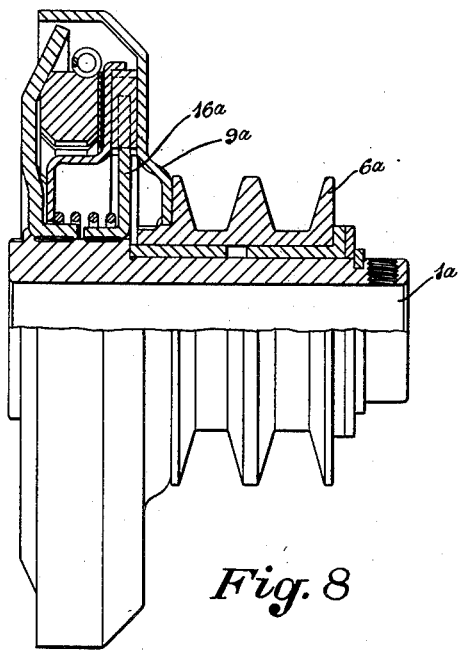
Fig. 8 is a side elevation, partially in section, illustrating a slightly modified form of clutch.

An axial clutch incorporating the improvements of the present invention is illustrated in Figs. 1 through 7. The driving member of the clutch includes a driving sleeve or hub 1 which may be secured to a driving shaft (not shown) by a set screw in opening 2 and driven by such driving shaft by a key in keyway 3. Hub member 1 is preferably formed from tube or bar stock and may be manufactured on an automatic or turret lathe or the like. An outer surface of the hub 1 is provided with a knurled annular zone 4 adjacent one end thereof, and the remainder of the outer hub surface may be finished by grinding for receiving a bearing metal sleeve 5.

The driven member generally indicated at 6 may comprise a V-grooved pulley assembled with a press fit on the bearing member 5 against the annular flange 7 of member 5, and the member 6 is provided with an annular shoulder 8 over which is telescoped a sheet metal housing member 9 having a disc-like wall 10 and an annular skirt wall 11. Disc wall 10 is seated against one pulley groove side wall 12 and is staked to the member 6 at 13 by a solid stake extending entirely around the periphery of the shoulder 8. For maintaining rotative connection between the members 6 and 9, one or more key stakes 14 also may be formed after the formation of the continuous stake 13.

The hub portion 15 of a sheet metal torque plate 16 is pressed onto the knurled portion 4 of the hub member 1. Likewise, a hub portion 17 of a generally disc-like sheet metal back plate member 18 is pressed onto the remainder of the knurled portion 4 of the hub member 1. Thus the members 16 and 18 are held securely fixed on the hub to rotate therewith. In addition, a number of stakes 19 (Fig. 4) may be formed on the hub member 1 to hold the member 18 against endwise movement to the left, viewing Fig. 1. An annular compartment generally indicated at 20 is thus formed between the torque plate 16 and back plate 18.

A sheet metal pressure plate member 21 is mounted within the compartment 20 between the torque plate 16 and back plate 18 and the member 21 is formed with an inner radially extending disc-like portion 22, an axially extending flange-shoulder portion 23, a radially extending disc-like engaging portion 24, and an outer axially extending annular flange 25.

The torque plate 16 is provided with a plurality of annularly spaced, radially-opening slots 26 (Fig. 3) in which a series of flat friction shoe members 27 is mounted between the pressure plate 21 and the disc wall 10 of driven member 9; and when the clutch is assembled, the flange 25 on pressure plate 21 prevents the friction shoes 27 from appreciable outward radial movement.

The pressure plate 21 is free to move axially with respect to the back plate member 18, the torque plate member 16 and the disc wall 10 of the driven member housing 9; and plate 21 is normally held in the position shown in Fig. 1 when the clutch is at rest by spring 28, the portion 22 of plate 21 being pushed against the back plate member 18 by spring 28.

Figure 7:
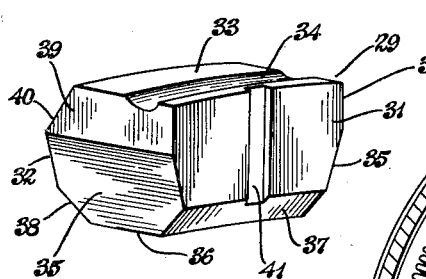
Fig. 7 is a perspective view of one of the weight segments of the clutch illustrated in Figs. 1 through 6.
Figure 6:
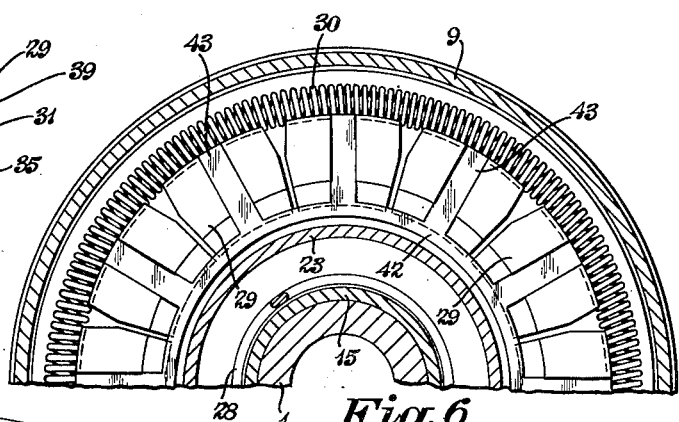
Fig. 6 is a view similar to Fig. 5 but looking in the direction of the arrows 6—6, Fig. 2.

A series of weight segments 29 is mounted within the compartment 20, one of said segments being illustrated in Fig. 7, and this series of segments 29 is normally held assembled together by an annular spring 30. Each weight segment 29 has a flat side face 31 for engagement with the disengaging portion 24 of the pressure plate member 21, another flat side face 32 on its opposite side, an outer arcuate top face 33 in which a groove 34 is formed for receiving spring 30, radially formed angled end faces 35, and an inner arcuate bottom face 36. The corners of the weight segments 29 between the side faces 31 and 32 and inner arcuate face 36 are preferably beveled as indicated respectively at 37 and 38; and the corners between the end faces 35 and the top arcuate face 33 also may be beveled as indicated at 39 in parallel relation (Fig. 6). A wedge surface 40 is formed on each weight segment 29 in the outer portion thereof extending from the flat side face 32 upward and inward toward the top curved face 33 for a purpose to be described; and a radial slot or recess 41 is preferably formed centrally in the flat side face 31.

The clutch also includes a spider-like sheet metal ring member 42 (Figs. 5 and 6) having radially extending fingers 43. When the clutch is assembled, one finger 43 is seated in the slot 41 of each wedge segment, the thickness of the finger 43 being less than the depth of the slot 41.

Figure 5:
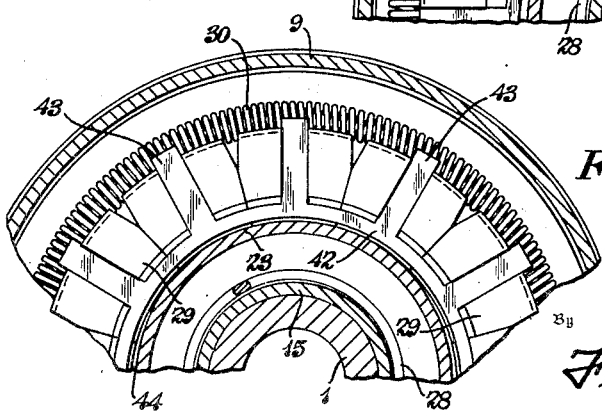
Fig. 5 is a fragmentary view on a smaller scale looking in the direction of the arrows 5—5, Fig. 1.

When the wedge segments are assembled as shown in Fig. 5 they form a complete or continuous weight ring held by the spring 30 seated in the grooves 34 with the angled end faces 35 of adjacent wedge segments in contact. When the continuous annular weight ring is formed as shown in Fig. 5 by the weight segments 29, the inner arcuate surfaces 36 of the wedge segments 29 form a continuous cylindrical surface having a diameter slightly larger than the outer diameter of the continuous cylindrical shoulder portion 23 of the pressure plate 21. This difference in diameters is best shown in Figs. 1 and 5 wherein the top weight segment 29 of the weight ring when the clutch is at rest hangs on the pressure plate shoulder 23 and contacts the same with an axially extending line contact, while the inner arcuate surfaces 36 of the lower weight segments 29 are clear of contact with the pressure plate shoulder 23, as indicated at 44 in Figs. 1 and 5.

Referring particularly to Fig. 1, the back plate member 18 is formed at its outer portion with a conical surface 45 complementary to the conical wedge surfaces 40 of the weight segments 29.

When the clutch is assembled as shown in Fig. 1, the members 16 and 18 are fixed to the hub 1; and the driven member 6 pressed onto the bearing member 5 is held against axial movement with respect to members 16 and 18 by contact between the end of bearing sleeve 5 against member 16 as indicated at 46, and by thrust washer member 47 and split retaining ring 48 seated in annular groove 49 of hub 1.

In this assembled position of the clutch at rest, the axial distance between the engaging portion 24 of pressure plate 21 and the disc wall 10 of driven housing member 9 is greater than the thickness of the flat friction shoes 27, so that there is no driving engagement between the driving and the driven members. This difference in dimension is illustrated by the clearance space indicated at 50 in Fig. 1. Under these same conditions, the axial distance between the flat side faces 31 and 32 of the weight segments 29 is less than the distance between the disc portion 24 of pressure plate 21 and the flat portion 51 of back plate 18, illustrated by the clearance space indicated at 52 in Fig. 1.

In assembling the clutch, back plate member 18 is pressed onto hub member 1. An assembled weight ring formed of weight segments 29, retaining spring 30 and spider ring 42 is telescoped over shoulder 23 of pressure plate 21 and these parts are then assembled against back plate 18. Torque plate 16 is then pressed onto hub 1 and friction shoes 27 are inserted in slots 26, spring 28 having been interposed between pressure plate 21 and torque plate 16. The driven housing member assembly is then formed of members 5, 6 and 9 and this assembly is telescoped over hub 1 and secured in position by thrust washer 47 and retaining ring 48.

The weight segments 29 are preferably formed of sintered graphitic iron which may have some lead therein and which has porosity for oil impregnation to provide lubrication for the surfaces thereof which engage pressure and back plate members 16 and 18. The angle of the wedge surfaces 40 and 45, with respect to the vertical viewing Fig. 1, is critical in that if too acute an angle is used the wedges will not release from wedge-engaged position shown in Fig. 2, and if the angle is to great there is a loss in mechanical advantage in translating the centrifugal pressure of the weights into axially directed forces acting against the pressure plate 21. This angle should not be below 20° and approximately a 25° angle is preferred.

The friction shoes 27 are flat, as indicated, and are made of a usual brake shoe material, being cut from flat strips having a width equal to the width of the shoes without any material waste. The friction shoes 27 when worn can be readily replaced merely by removing retaining ring 48, thrust washer 47 and the driven member assembly.

As shown in Fig. 1, the spring 28 holds the portion 22 of the pressure plate 21 against the back plate 18 establishing the clearance space 50 so that there is no residual friction between the driving and driven members. This is a necessary condition in some clutch installations. The spring 28, however, has other functions. It holds member 22 against back plate 18 when the clutch is at rest, so that the pressure plate immediately rotates upon rotation of the driving member. Also, when the clutch is at rest, the size of that portion of compartment 20 between pressure plate 21 and back plate 18 provides an adequate guide for the assembled weight ring which hangs loosely within this space due to clearances 44 and 52.

The arrangement of the flat disc-like engaging surfaces 10 and 24 on members 9 and 21 and on flat friction shoes 27 provides solid face contact between the pressure plate, friction shoes and driven member 9 and also provides for imparting uniform pressure on the friction shoes by the resultant axially directed forces imparted by the weight segments 29.

The arrangement by which the spring 30 surrounds the outer surfaces of the weight segments 29 to hold them assembled, rather than by providing slots in the side surfaces of the weight segments to receive spring 30, avoids offsetting the center of mass of the weight segments to any substantial degree, thereby reducing the tendency of the weight segments to twist or cock out of the desired positions illustrated in Figs. 1 and 2. The spring 30 in addition to functioning as a means of holding the weight segments in a weight ring when at rest, also determines the speed at which the segments move outward by centrifugal force, thus engaging the clutch. That is to say, for example, if a 1750 R. P. M. motor is connected with the driving member, it may be desirable to have the clutch automatically engage or disengage at some predetermined lower speed such as 800 or 1000 R. P. M. The strength of the spring 30 is therefore designed as an 800 or 1000 R. P. M. spring as desired.

The operation of the clutch is illustrated in Figs. 1 and 2, Fig. 1 showing the parts when the clutch is at rest, and Fig. 2 showing the parts when the clutch is engaged. As the driving member or hub 1 comes up to speed, the torque plate 16, friction shoes 27, pressure plate 21 and back plate 18 rotate therewith. However, the weight ring formed by the weight segments 29 assembled by spring 30 has clearance at 52 and 44 between back plate 18 and pressure plate 21 with only the casual line contact between the top weight segment 29 and shoulder 23 on pressure plate 21. Because of the inertia of the weight ring, a predetermined period of time will elapse before any appreciable rotation is imparted to the weight ring, and before the speed thereof is such that the weight segments 29 will be thrown outward by centrifugal force. Thus the construction provides for inertia delay of clutch engagement permitting the engine or motor to which the driving member is attached to accelerate to its effective operating speed before the load is engaged therewith.

As soon as the speed of the weight ring is such that centrifugal force overcomes the restraining capacity of spring 30, the weight segments 29 move outward and the wedge surfaces 40 thereof engage wedge surface 45 on the back plate 18 whereby the centrifugal pressure of the weight segments is translated into axial forces pressing against the pressure plate 21 to force the pressure plate against the friction shoes 27 which in turn are pressed against the disc portion 10 of driven member housing 9 thereby engaging the clutch as shown in Fig. 2 with uniform pressure on all of the friction shoes 27.

The outward radial movement of the weight segments 29 is guided in radial paths by the fingers 43 extending in the weight segment slots 41 as shown in Figs. 5 and 6.

When the speed of the driving member is reduced below the predetermined engaging speed for which the spring 30 is designed, the spring 30 will collapse the weight segments 29 into the continuous weight ring illustrated in Fig. 5, thereby disengaging the clutch automatically.

A slightly modified form of clutch is illustrated in Fig. 8 in which the shapes of the torque plate 16a and housing member 9a are modified, and a two-grooved pulley driven member 6a is journalled on driving member hub 1a. Otherwise, the construction and operation of the clutch shown in Fig. 8 is the same as that of the clutch shown in Fig. 1.

Figure 9:
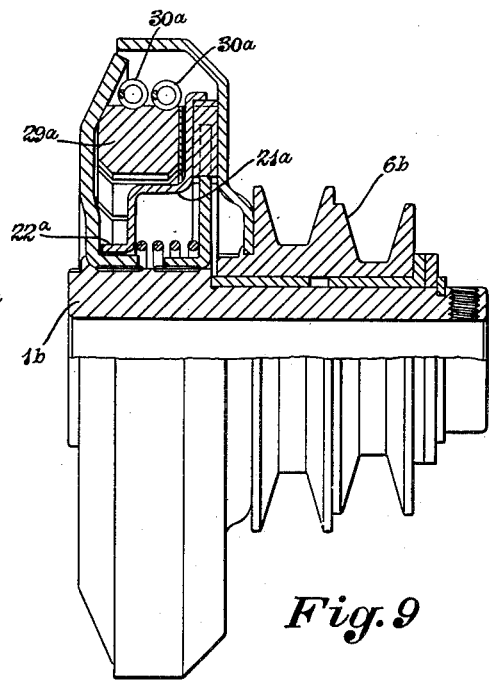
Fig. 9 is a view similar to Fig. 8 of a still further modified form of clutch of increased capacity.

In accordance with the present invention it is relatively easy to change the capacity of the clutch by minor changes in only a few of the clutch parts. This is illustrated in Fig. 9 wherein the clutch capacity is increased by increasing the thickness of the weight segments 29a, by providing two springs 30a, by providing a flange 22a on pressure plate 21a and by spacing the back plate and torque plate further apart on the driving hub member 1b. Fig. 9 also illustrates a modified form of two-groove pulley driven member 6b. Thus many of the same parts may be used in making different clutch sizes thereby reducing the cost of tooling for the manufacture of clutches of various capacities for various uses.

In operation, heat developed in the clutch is rapidly dissipated from the outer surfaces of the sheet metal clutch members, which sheet metal members may be formed as sheet metal stampings thus providing for the manufacture thereof in a simplified manner using production methods.

Accordingly, the present invention provides an improved, durable, effective and reliable clutch construction having relatively few parts; having parts of simplified construction and shape which may be fabricated readily by production methods with a minimum of loss; having parts which may be assembled readily and repaired or replaced at minimum expense; having inertia delayed engagement and being capable of satisfactory operation at temperatures below the freezing point of liquids such as mercury; and overcoming the disadvantages and difficulties of prior art clutches.

The embodiments of the present invention illustrated and described herein are by way of example and the scope of the present invention is not limited to the exact details of construction of the various parts illustrated.

Finally, in the foregoing description certain terms have been used for brevity, clearness and understanding, but no unnecessary limitations are to be implied therefrom beyond the requirements of the prior art, because such words are utilized for descriptive purposes herein and not for the purpose of limitation, and are intended to be broadly construed.

Having now described the features of the invention, the construction, operation and use of preferred embodiments thereof, and the advantageous, new and useful results attained by the improved constructions, the new and useful devices, constructions, arrangements, combinations, sub-combinations, parts and elements, and reasonable mechanical equivalents thereof, obvious to those skilled in the art are set forth in the appended claims.

We claim:

1. In a weight actuated centrifugal clutch, a rotatable driving member including axially spaced torque and back plate means forming an annular compartment therebetween, said torque and back plate means being fixed against relative movement with respect to the driving member for rotation therewith, flat friction shoe means driven by the torque plate means and movable axially relative thereto, pressure plate means in said compartment movable axially relative to said torque and back plate means and engageable with said friction shoe means, a series of separable weight segments forming an annular weight ring loosely suspended on said pressure plate means between said back and pressure plate means with clearance between the said ring segments and said back and pressure plate means when the clutch is at rest, said weight ring segments always being out of contact with said torque plate means, complementary wedge surfaces on said weight segments and back plate means engageable when said segments are thrown outward by centrifugal force upon rotation of the weight ring, and a driven member housing having an engaging surface adjacent said friction shoe means.

2. The weight actuated centrifugal clutch construction defined in claim 1 in which the pressure plate means is formed with an annular shoulder, and in which the annular weight ring surrounds and is suspended on said shoulder and has an inner diameter greater than the outer diameter of the shoulder.

3. The weight actuated centrifugal clutch construction defined in claim 1 in which the torque plate means is provided with radially opening slots wherein the friction shoe means are axially movable.

4. The weight actuated centrifugal clutch construction defined in claim 1 in which the torque plate means is provided with radially opening slots wherein the flat friction shoe means are mounted, and in which the pressure plate means is provided with an annular flange surrounding and preventing radial movement of the friction shoe means.

5. In a weight actuated centrifugal clutch, a rotatable driving member including axially spaced torque and back plate means forming an annular compartment therebetween, said torque and back plate means being fixed against relative movement with respect to the driving member for rotation therewith, flat friction shoe means driven by the torque plate means and movable axially relative thereto, pressure plate means in said compartment movable axially relative to said torque and back plate means, there being an annular shoulder formed on said pressure plate means, a series of separable solid weight segments forming an annular weight ring surrounding and suspended on said shoulder and having an inner diameter greater than the outer diameter of the shoulder, spring means surrounding said weight segments and holding the same in annular ring form when the clutch is at rest, complementary wedge surfaces on said weight segments and back plate means engageable when said segments are thrown outward by centrifugal force upon rotation of the weight ring, and a driven member housing having an engaging surface adjacent said friction shoe means.

6. In a weight actuated centrifugal clutch, a rotatable driving member including axially spaced torque and back plate means forming an annular compartment therebetween, said torque and back plate means being fixed to the driving member for rotation therewith, there being radially opening slots provided in the torque plate means, flat friction shoe means mounted in said slots driven by the torque plate means and movable axially relative thereto, pressure plate means in said compartment movable axially relative to said torque and back plate means, spring means normally pressing the pressure plate means toward the back plate means and away from the torque plate means, the pressure plate means having an annular flange surrounding and preventing radial movement of the friction shoe means, a series of separable weight segments forming an annular weight ring loosely suspended on said pressure plate means between said back and pressure plate means when the clutch is at rest, complementary wedge surface on said weight segments and back plate means engageable when said segments are thrown outward by centrifugal force upon rotation of the weight ring, and a driven member housing having an engaging surface adjacent said friction shoe means.

7. In a weight actuated centrifugal clutch, a rotatable driving member including axially spaced torque and back plate means forming an annular compartment therebetween, said torque and back plate means being fixed to the driving member for rotation therewith, there being spaced radially opening slots provided in the torque plate means, flat friction shoe means mounted in said slots driven by the torque plate means and movable axially relative to the torque plate means, pressure plate means in said compartment movable axially relative to said torque and back plate means, spring means normally pressing the pressure plate means toward the back plate means and away from the torque plate means to maintain clearance between the pressure plate means and said friction shoe means when the clutch is at rest, there being an annular flange on said pressure plate means surrounding said friction shoe means and preventing radial movement thereof, said pressure plate means being provided with an annular shoulder, a series of separable solid weight segments forming an annular weight ring surrounding and suspended upon said shoulder and having an inner diameter greater than the outer diameter of the shoulder, there being clearance space provided between the weight segments and the back and pressure plate means when the clutch is at rest, annular spring means surrounding said weight segments holding the same in annular ring form when the clutch is at rest, complementary wedge surfaces on said weight segments and back plate means engageable when said segments are thrown outward by centrifugal force upon rotation of the weight ring, and a driven member housing having an engaging surface adjacent said friction shoe means.

8. In a weight actuated centrifugal clutch, a rotatable driving member including axially spaced torque and back plate means forming an annular compartment therebetween, said torque and back plate means being fixed to the driving member for rotation therewith, there being spaced radially opening slots provided in the torque plate means, flat friction shoe means mounted in said slots driven by the torque plate means and movable axially relative to the torque plate means, pressure plate means in said compartment movable axially relative to said torque and back plate means, spring means normally pressing the pressure plate means toward the back plate means and away from the torque plate means to maintain clearance between the pressure plate means and said friction shoe means when the clutch is at rest, there being an annular flange on said pressure plate means surrounding said friction shoe means and preventing radial movement thereof, said pressure plate means being provided with an annular shoulder, a series of separable solid weight segments forming an annular weight ring surrounding and suspended upon said shoulder and having an inner diameter greater than the outer diameter of the shoulder, there being clearance space provided between the weight segments and the back and pressure plate means when the clutch is at rest, annular spring means surrounding said weight segments holding the same in annular ring form when the clutch is at rest, complementary wedge surfaces on said weight segments and back plate means engageable when said segments are thrown outward by centrifugal force upon rotation of the weight ring, and a driven member housing provided with a flat disc-like engaging surface adjacent said friction shoe means and an annular flange surrounding the pressure, torque and back plate means and said weight segments and friction means.

ARTHUR M. WICKWIRE.
RALPH M. KESSEL.

References Cited in the file of this patent

UNITED STATES PATENTS

| Number | Name | Date |
|---|---|---|
| 1,720,766 | Spahn | July 16, 1929 |
| 1,734,598 | Schramm | Nov. 5, 1929 |
| 1,766,227 | Russell | June 24, 1930 |
| 2,460,539 | Shank | Feb. 1, 1949 |